US011865551B2

(12) United States Patent
DiCarlo

(10) Patent No.: US 11,865,551 B2
(45) Date of Patent: Jan. 9, 2024

(54) METHODS AND SYSTEMS FOR NEGATIVE ION-BASED POLLUTION REDUCTION

(71) Applicant: RainIons Corp., Colorado Springs, CO (US)

(72) Inventor: Mark DiCarlo, Eugene, OR (US)

(73) Assignee: Rainlons Corp., Eugene, OR (US)

( * ) Notice: Subject to any disclaimer, the term of this patent is extended or adjusted under 35 U.S.C. 154(b) by 302 days.

(21) Appl. No.: 17/127,273

(22) Filed: Dec. 18, 2020

(65) Prior Publication Data

US 2022/0193694 A1 Jun. 23, 2022

(51) Int. Cl.

*B03C 3/36* (2006.01)
*F24F 8/30* (2021.01)
*B03C 3/30* (2006.01)
*B03C 3/38* (2006.01)

(52) U.S. Cl.

CPC ................ *B03C 3/368* (2013.01); *B03C 3/30* (2013.01); *B03C 3/363* (2013.01); *B03C 3/38* (2013.01); *F24F 8/30* (2021.01)

(58) Field of Classification Search

CPC .... B03C 3/95; B03C 3/96; B03C 3/55; B03C 3/422; B03C 3/421

See application file for complete search history.

(56) References Cited

U.S. PATENT DOCUMENTS 4,037,268 A * 7/1977 Gallagher ................. B03C 3/38 361/231
4,109,290 A * 8/1978 Gallagher ............... H01T 23/00 361/231
4,216,000 A * 8/1980 Kofoid .................... H01T 19/00 96/99
4,391,773 A * 7/1983 Flanagan .................. A61L 9/22 96/99
4,743,275 A * 5/1988 Flanagan ................ H01T 23/00 95/81
5,005,101 A * 4/1991 Gallagher ............... H01T 23/00 361/231
5,912,396 A 6/1999 Wong (Continued)

FOREIGN PATENT DOCUMENTS

EP 2453114 A1 5/2012

*Primary Examiner* — Christopher P Jones
*Assistant Examiner* — Sonji Turner
(74) *Attorney, Agent, or Firm* — Polygon IP, LLP

(57) ABSTRACT

Provided are purification systems and methods of using such systems for purifying various environments, such as indoor air, outdoor air, vehicle emissions, and industrial emissions. A purification system comprises an ionizing purifier having a substrate and an active coating. The active coating comprises a pyroelectric and/or piezoelectric material. During the operation, an incoming stream is directed toward the active coating while controlling the average pressure exerting on the active coating. This contact between the incoming stream and the active coating generates negative ions from components of the incoming stream via change in temperature and pressure/force/vibration, etc. The negative ions then interact with pollutants, transforming them into safe, purified materials of the outgoing stream. Unlike the pollutants in the incoming stream, the purified materials are non-harmful, and/or can be easily removed from the outgoing stream, e.g., by filtering and/or other separation techniques.

25 Claims, 14 Drawing Sheets

(56) References Cited

U.S. PATENT DOCUMENTS

| | | | |
|---|---|---|---|
| 7,070,744 | B2 | 7/2006 | Son |
| 8,961,651 | B1 | 2/2015 | Gokturk |
| 8,988,847 | B2 | 3/2015 | Bologurov et al. |
| 10,363,515 | B2 | 7/2019 | DiCarlo |
| 2016/0228882 | A1* | 8/2016 | Lin ........................... F24F 8/30 |
| 2018/0207312 | A1* | 7/2018 | Chiang .............. B01D 46/4245 |
| 2021/0321696 | A1* | 10/2021 | Skiba .................... D06M 16/00 |

* cited by examiner

METHODS AND SYSTEMS FOR NEGATIVE ION-BASED POLLUTION REDUCTION

BACKGROUND

Air pollution is a major issue throughout the world, attributed to various health issues. For example, an estimated seven million people die every year from air pollution. At the same time, air pollution appears to be a predominant form of pollution in the world with more pollutants being discharged into the air than into the water and land combined. For purposes of this disclosure, air pollution is defined as environmental contamination of air by any agent that modifies the atmosphere's natural characteristics.

Various method and systems have been proposed to mitigate air pollution and, more specifically, to remove pollutants from the ambient air and gas streams discharged into the air (e.g., vehicle exhaust systems, smokestacks). For example, ionizers have been proposed for pollution reduction. In a typical ionizer, a voltage is applied between electrodes, causing an electrical discharge through the environment between the electrodes. However, these methods typically create other environmental concerns, such as ozone generation. Furthermore, these methods tend to be inefficient, require substantial power, special construction, and do not rely on ways of air purification found in nature.

SUMMARY

Provided are purification systems and methods of using such systems for purifying various environments, such as indoor air, outdoor air, vehicle emissions, industrial emissions, etc., via a purification system comprising an ionizing purifier having a substrate and an active coating. The active coating comprises a pyroelectric and/or piezoelectric material. During the operation, an incoming stream is guided toward the active coating while controlling the average pressure exerting on the active coating. This contact between the incoming stream and the active coating generates negative ions from components of the incoming stream via change in temperature and pressure/force/vibration, etc. The negative ions then interact with pollutants, transforming them into safe, purified materials of the outgoing stream. Unlike the pollutants in the incoming stream, the purified materials are non-harmful, and/or can be easily removed from the outgoing stream, e.g., by filtering and/or other separation techniques.

In some examples, a method of purifying an incoming stream using a purification system to form an outgoing stream is provided. The method comprises flowing the incoming stream into an ionizing purifier of the purification system. The incoming stream comprises one or more pollutants. The ionizing purifier comprises a substrate and an active coating, disposed on the substrate and comprising a material, which is a pyroelectric and/or or a piezoelectric. The method also comprises directing the incoming stream toward the active coating while controlling an average pressure that the incoming stream exerts on the active coating. The incoming stream generates negative ions from one or more components of the incoming stream upon contacting the active coating. The negative ions interact with the one or more pollutants forming purified materials of the outgoing stream. The method further comprises guiding the outgoing stream, comprising the purified materials, from the ionizing purifier.

In some examples, the material comprises one of aluminum nitride, aluminum phosphate, barium titanate, bismuth titanate, gallium nitride, gallium phosphate, lithium niobate, lithium tantalate, lithium tetraborate, quartz, tourmaline, triglycine sulfate, and zinc oxide. In more specific examples, the material contains at least two different ones of aluminum nitride, aluminum phosphate, barium titanate, bismuth titanate, gallium nitride, gallium phosphate, lithium niobate, lithium tantalate, lithium tetraborate, quartz, tourmaline, triglycine sulfate, and zinc oxide.

In some examples, directing the incoming stream toward the active coating is performed while controlling a temperature of the incoming stream before contacting the active coating. More specifically, controlling the temperature of the incoming stream before contacting the active coating comprising flowing the incoming stream through a temperature controller before contacting the active coating. In some examples, the temperature controller comprises at least one of a heater and an air conditioner/chiller.

In some examples, directing the incoming stream toward the active coating is performed while controlling a temperature of the active coating. In more specific examples, controlling the temperature of the active coating is performed using a temperature controller, thermally coupled to the active coating. For example, controlling the temperature of the active coating comprises controlling a flow rate of the incoming stream, flowing into the ionizing purifier.

In some examples, directing the incoming stream toward the active coating is performed while controlling a contact angle between the incoming stream and the active coating. In more specific examples, controlling the contact angle between the incoming stream and the active coating comprises guiding the incoming stream through a flow guide.

In some examples, the active coating is enclosed within the ionizing purifier, blocking environmental light when the incoming stream generates the negative ions from the one or more components of the incoming stream. In more specific examples, the active coating is free from sunlight exposure when generating the negative ions.

In some examples, the substrate, supporting the active coating, is selected from the group consisting of a fan blade, a filter surface, an enclosure surface, ionizer electrodes, smokestack interior walls, scrubber components, and electrostatic precipitator components. In the same or other examples, the active coating is a continuous coating, isolating the substrate, under the active coating, from the environment. Alternatively, the active coating comprises a plurality of disjoined particles, positioned on a surface of the substrate. In some examples, the substrate is porous. The active coating comprises a plurality of disjoined particles, disposed within the substrate and away from a surface of the substrate. In some examples, the substrate comprises pores such that the active coating forms a surface of the pores. In some examples, the active coating comprises active coating pores such that the incoming stream is directed into the active coating pores.

In some examples, directing the incoming stream toward the active coating is performed through a set of concentric structures, at least one of which is operable as the substrate for the active coating. For example, at least another one of the concentric structures comprises a set of openings, operable as a flow guide, directing the incoming stream toward the active coating. In some examples, at least one structure of the set of concentric structures is an air filter. In some examples, the set of concentric structures is a part of an automotive exhaust system.

In some examples, directing the incoming stream to the active coating is performed using a fan, operable as a flow speed controller. The controlling of the average pressure that the incoming stream is exerting on the active coating comprises controlling a rotational speed of the fan.

In some examples, the incoming stream, flown into the ionizing purifier, comprises water.

In some examples, the method further comprises separating the purified materials from the outgoing stream.

Also provided is a purification system for purifying an incoming stream. In some examples, the purification system comprises an ionizing purifier, comprising a substrate and an active coating. The active coating is disposed on the substrate and comprises a material, which is a pyroelectric and/or or a piezoelectric. The purification system is configured to direct the incoming stream toward the active coating while controlling an average pressure that the incoming stream exerts on the active coating.

In some examples, the purification system further comprises a temperature controller, configured to control a temperature of the incoming stream before the incoming stream contacts the active coating. For example, the temperature controller comprises at least one of a heater and an air conditioner/chiller.

In some examples, the purification system further comprises a temperature controller, thermally coupled to the active coating and configured to control a temperature of the active coating.

In some examples, the purification system comprises a flow guide, configured to control a contact angle between the incoming stream and the active coating.

In some examples, the purification system further comprises a set of concentric structures such that at least one of which is operable as the substrate for the active coating.

In some examples, the purification system further comprises a flow speed controller, configured to control the average pressure that the incoming stream exerts on the active coating comprises controlling a rotational speed of the fan.

These and other embodiments are described further below with reference to the figures.

DETAILED DESCRIPTION

In the following description, numerous specific details are outlined in order to provide a thorough understanding of the presented concepts. The presented concepts may be practiced without some or all of these specific details. In other instances, well-known process operations have not been described in detail to not unnecessarily obscure the described concepts. While some concepts will be described in conjunction with the specific embodiments, it will be understood that these embodiments are not intended to be limiting.

Introduction

Described herein are methods and systems for purifying various environments using negative ions. Such purification methods may be also referred to as ion-based purification and/or ion-based pollution reduction. These methods and systems may be used for many different applications, various examples of which are disclosed herein. These applications include indoor and outdoor applications, vehicle emissions, and industrial applications. Some specific examples include purifying environments of medical facilities (e.g., surgical/operating rooms), air purification in home and office buildings (e.g., as standalone systems or integrated into heating-ventilation-air conditioning (HVAC) systems), treating emissions in factory smokestacks, scrubbers, electro-static precipitators and other types of industrial equipment, Carbon Dioxide Capture technology/equipment, and many other like applications. Furthermore, these methods and systems are capable of removing both manmade and natural pollutants, such as particulate matter, ozone, carbon monoxide, lead, hydrocarbons, volatile organic compounds, nitrogen oxides, carbon dioxide, sulfur dioxide, smog, volcanic gases, and many other like pollutants.

Figure 1A:
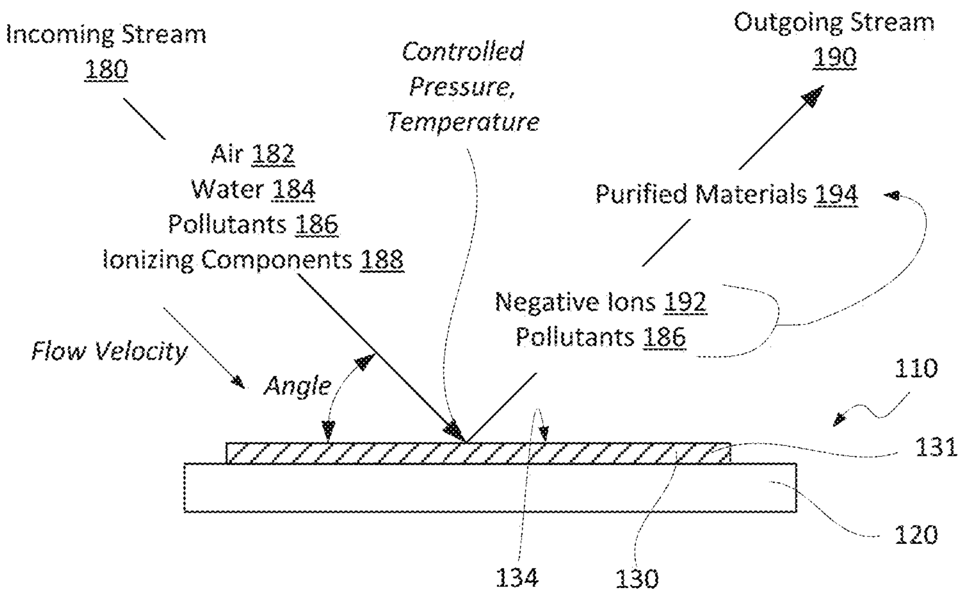
FIG. 1A is a schematic illustration of purifying an incoming stream using negative ions generated when the incoming stream contacts an active coating, in accordance with some examples.

Unlike conventional purification approaches, methods, and systems disclosed herein are environmentally friendly, efficient, and cost effective. Specifically, these methods and systems utilize biomimicry-based solutions, which represent various ways of air pollutant purification found in nature. This novel purification approach will now be introduced with reference to FIG. 1A. Specifically, FIG. 1A is a schematic illustration of ionizing purifier 110 during treatment of incoming stream 180. Ionizing purifier 110 may be a part of various systems, such as various purification systems described below with reference to FIGS. 2A-2C, vehicle emission systems described below with reference to FIGS. 6A-6D, and industrial emission control systems described below with reference to FIGS. 7A and 7B.

Referring to FIG. 1A, ionizing purifier 110 comprises substrate 120 and active coating 130, disposed on substrate 120. In some examples, active coating 130 and substrate 120 are the same components, i.e., active coating 130 is a self-supporting structure. Active coating 130 comprises material 131, which is pyroelectric and/or piezoelectric. Various examples of suitable pyroelectric and/or piezoelectric materials are presented below. It should be noted that all known pyroelectric materials are also piezoelectric.

Active coating 130, substrate 120, and other features of these methods and systems (e.g., flow rates, temperatures) are uniquely selected to generate negative ions 192 at surface 134 of active coating 130. More specifically, active coating 130 generates an electric change and negative ions when heated or cooled, and/or when pressure/stress/force is applied to coating surface 134. The pressure is applied, for example, by incoming stream 180, comprising one or more pollutants 186. Other components of incoming stream 180 may include air 182, water 184 (e.g., in a gas form), and ionizing components 188. Any one of these components in incoming stream 180 may generate negative ions 192 when they generate a heating or cooling affect, and/or pressure/force on the coating surface 134.

Figure 1B:
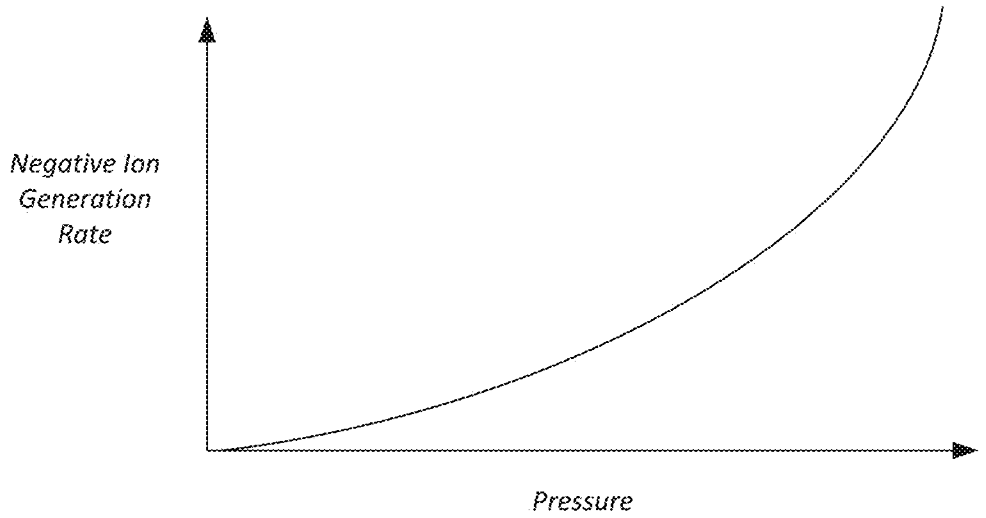
FIG. 1B is a plot showing a negative ion generation rate as a function of the pressure applied by the incoming stream to the active coating.

It should be noted that both the temperature at the interface of active coating 130 and incoming stream 180 and the pressure applied by incoming stream 180 onto coating surface 134 impact the negative ion generation. FIG. 1B is a plot showing a negative ion generation rate as a function of the pressure applied by incoming stream 180 to active coating 130. The ion generation rate increases with the pressure. Without being restricted to any particular theory, it is believed that the mechanical energy, provided by this pressure, is converted into the electrical energy due to the piezoelectric effect provided by active coating 130. For example, a pressure increase of roughly 100 Pascals increases the emission rate of a specific type of tourmaline to 62,000 ions per cubic centimeter per second. It should be noted that this specific pressure is a function of the flow rate of incoming stream 180 (e.g., flow rate), the density of incoming stream 180, and the contact angle.

Figure 1C:
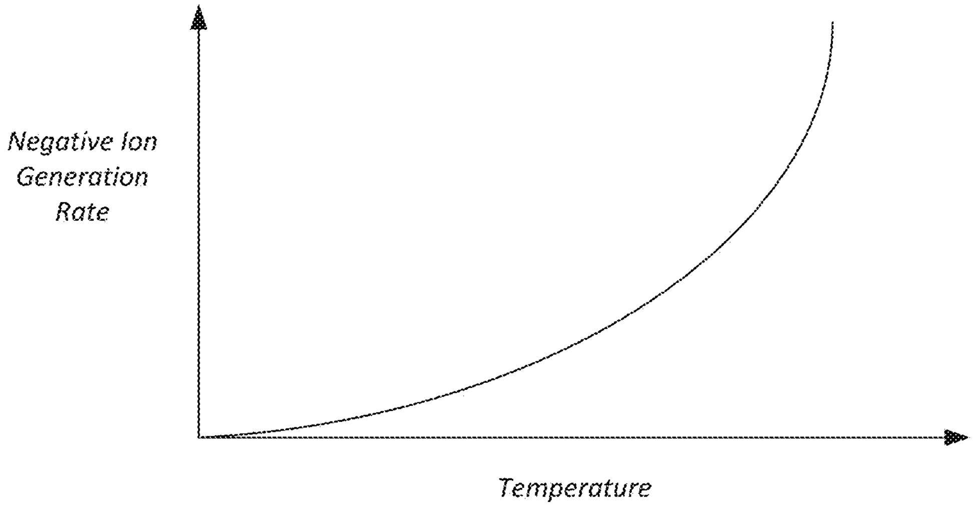
FIG. 1C is a plot showing a negative ion generation rate as a function of the temperature of the active coating surface while the incoming stream is directed toward that surface.

FIG. 1C is a plot showing a negative ion generation rate as a function of the temperature of active coating surface 134 while incoming stream 180 is directed toward that surface. Without being restricted to any particular theory, it is believed that the heat energy is converted into electrical energy due to the pyroelectric effect provided by active coating 130. The heat energy is supplied by incoming stream 180 (e.g., a hot vehicle emission) and/or a separate heating element (e.g., temperature controller 150 described below with reference to FIGS. 2A-2C). Furthermore, the heat may be carried to active coating surface 134 by incoming stream 180 and/or by active coating 130 (e.g., a heater thermally coupled to active coating 130). For example, at room temperature (e.g., about 20 degrees Celsius), the emission rate of 80-nanometer grain size tourmaline is approximately 1,500 ions per cubic centimeter per second. When heating this specific variety of tourmaline to 45 degrees Celsius, the emission rate is approximately 2,800 ions per cubic centimeter per second. At 135 degrees Celsius, the emissions rate was roughly 24,000 ions per cubic centimeter per second. This temperature is controlled, e.g., the temperature of incoming stream 180 and/or various temperature controllers (e.g., heaters and/or air conditioners/chillers), which are thermally coupled to active coating 130.

Returning to FIG. 1A, negative ions 192 interact with pollutants 186 to form purified materials 194, which are parts of outgoing stream 190. Various components of incoming stream 180 (e.g., air 182, ionizing components 188) may also form parts of outgoing stream 190 (e.g., without interacting with negative ions 192 and/or without participating in the formation of negative ions 192). Different types of interactions between negative ions 192 and pollutants 186 are within the scope such as (1) neutralizing positively charged pollutants, (2) making unstable pollutants even less stable (e.g., eventually causing decomposition); and/or (3) utilizing electron affinity of certain molecules to absorb electrons. For example, chlorine ($Cl_2$), which is highly toxic, poisonous, and corrosive, has a high affinity to absorb electrons and, as such, interact with negative ions. Upon reacting with negative ions, chlorine gains an electron and turns into chloride such as sodium chloride (NaCl), which is more commonly referred to as salt. Unlike chlorine ($Cl_2$), most chlorides are safe, non-toxic, and readily absorbed by plants. In another example, negative ions attract and attach to positively charged pollutants and dust. For example, nearly all dust particles in the air are positively charged. As the positively charged dust and negative ions are pulling towards each other, the negative ions stick together to create larger, heavier dust particles. These particles become too heavy to stay suspended in the air, falling to the ground or being drawn to the walls of enclosed spaces or buildings. This pollutant-binding process helps to remove suspended pollutants from the air. It should be noted that years of scientific research and numerous studies have validated that negative ions can eliminate air pollution. This technology will eliminate air pollution by (1) neutralizing positively charged pollutants, (2) making unstable pollutants even less stable (e.g., eventually causing decomposition); and/or (3) utilizing the electron affinity of certain molecules to absorb electrons.

In some examples, the methods and systems described herein also utilize the Lenard effect in the presence of water present. For purposes of this disclosure, the Lenard effect is defined as a process of generating an electric charge by splashing water onto a surface of one or more pyroelectric and/or piezoelectric materials described above. In these examples, water is provided as a fine spray, mist, or even gas (e.g., vapor) and directed at the surface of pyroelectric and/or piezoelectric materials using pressures and temperatures unique to each use case. It should be noted that this incoming stream includes other components. The pollutants may be presented among these other components and/or in the water. For example, scrubbers utilize water to dissolve pollutants in the water. A scrubber may be fitted with active coatings as further described below with reference to FIG. 7A.

Examples of Purification Systems

Figure 2A:
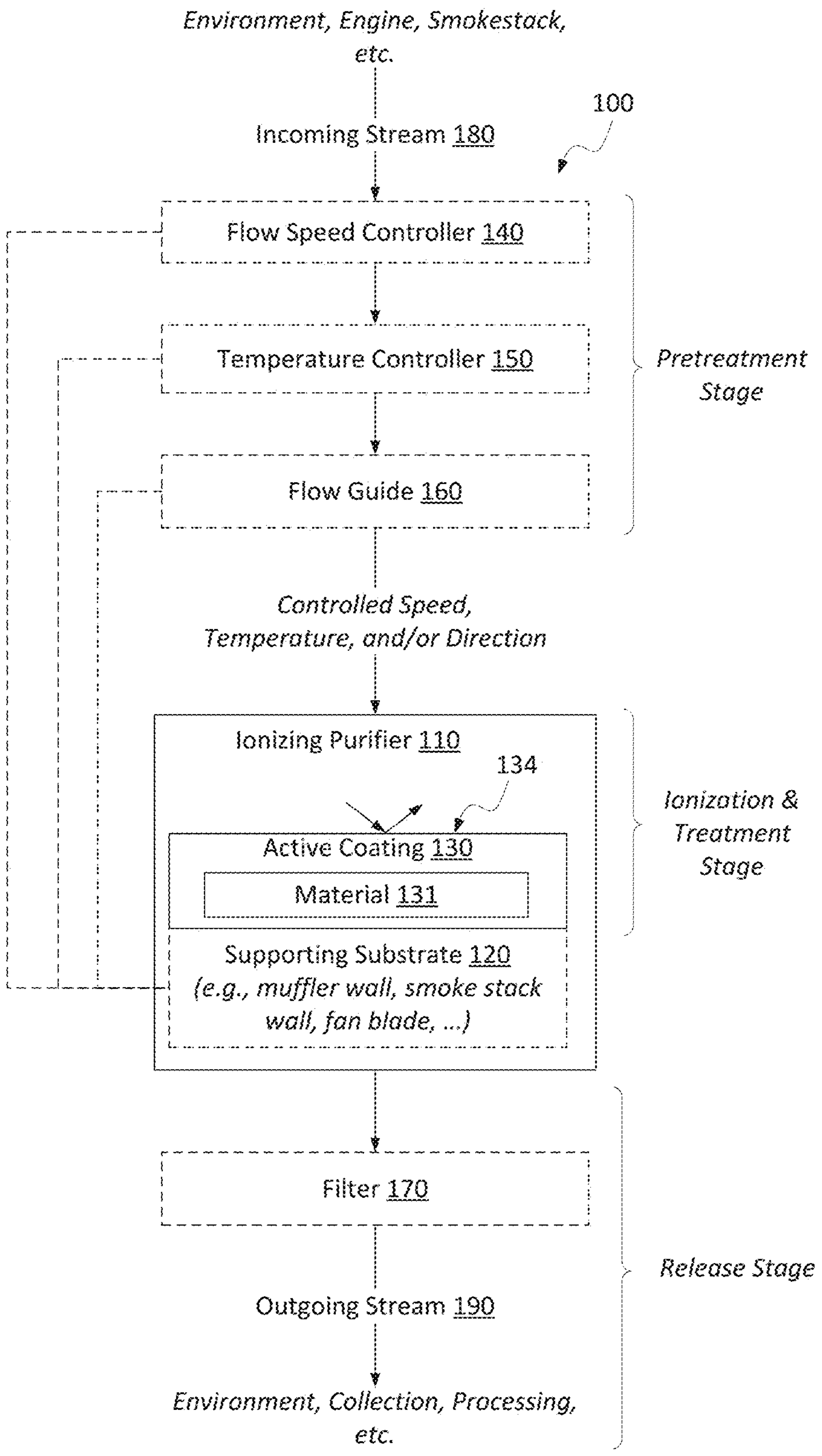
FIG. 2A is a schematic block diagram of a purification system, comprising an ionizing purifier, for purifying an incoming stream, in accordance with some examples.
Figure 2B:
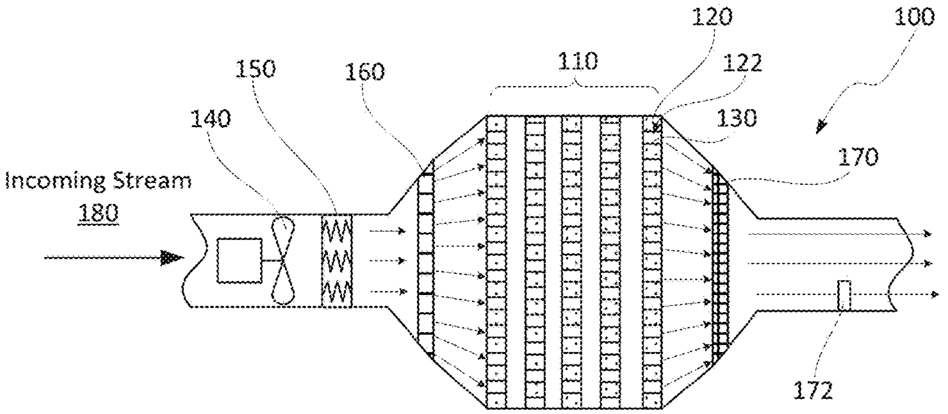
FIG. 2B is a schematic cross-sectional view of one example of the purification system with the ionizing purifier comprising pores with the active coating disposed within the pores.
Figure 2C:
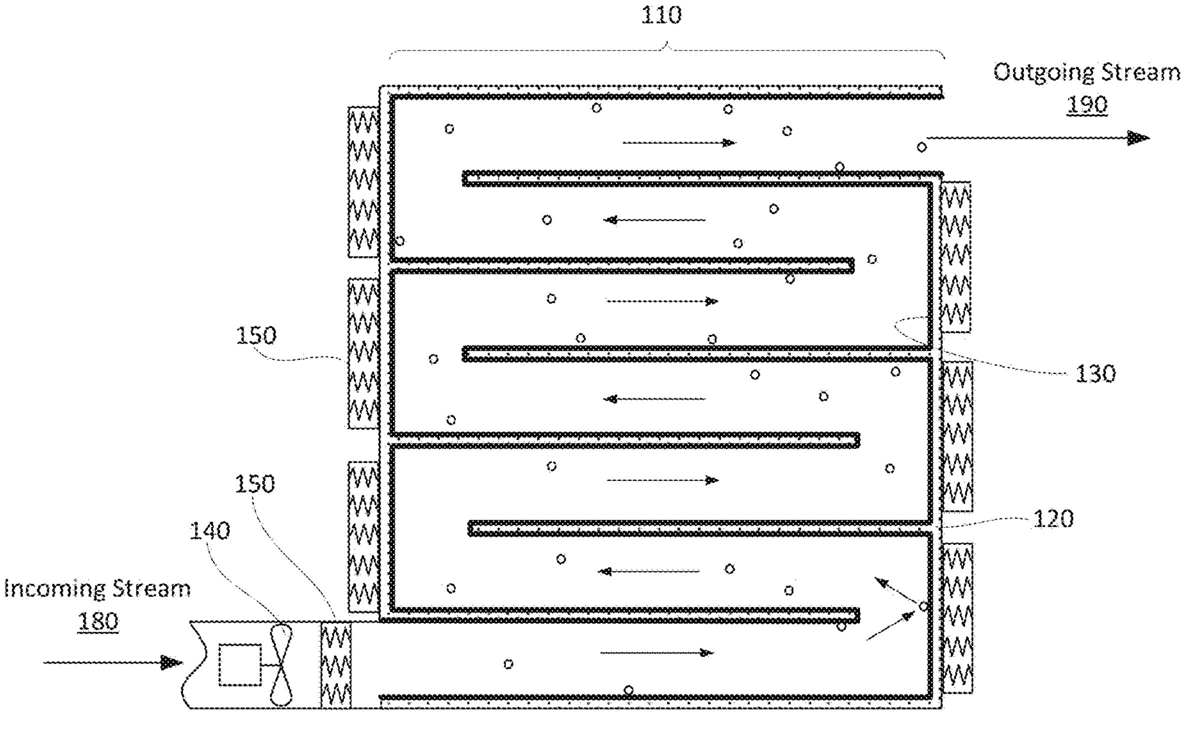
FIG. 2C is a schematic cross-sectional view of another example of the purification system with the ionizing purifier forming a lengthy path within the purification system.

FIG. 2A is a schematic block diagram of purification system 100, in accordance with some examples. FIGS. 2B and 2C are schematic illustrations of two examples of purification system 100. Purification system 100 comprises at least ionizing purifier 110, some examples of which are described above with reference to FIG. 1A. Other components of purification system 100, besides ionizing purifier 110, are optional. In some examples, purification system 100 also comprises flow speed controller 140 for controlling the speed of incoming stream 180 as incoming stream 180 is directed to active coating 130 as, e.g., is shown in FIGS. 2A and 2B. As noted above, the speed of incoming stream 180 determines the pressure onto active coating surface 134 and the generation of negative ions 192. Some examples of flow speed controller 140 include, but are not limited to, fans, turbines, valves, flow restrictors, flow diverters, and the like. The input to flow speed controller 140 may be provided from various sensors, e.g., flow meters, pollutant sensors, and the like (e.g., sensor 172 in FIG. 2B). In some examples, the speed of incoming stream 180 is controlled externally to purification system 100, e.g., in the vehicle exhaust systems, smokestacks, scrubbers, electrostatic precipitators and the like. It should be noted that some features of ionizing purifier 110 may be provided by flow speed controller 140. For example, fan blades or turbine blades may serve as substrate 120 for active coating 130. Furthermore, in some examples, the pressure applied to active coating 130 by incoming stream 180 is controlled by the movement of active coating 130, e.g., on the surface of fan blades or turbine blades.

In some examples, purification system 100 comprises temperature controller 150, which is another optional component. Temperature controller 150 is configured to control (e.g., change) the temperature of incoming stream 180 before incoming stream 180 contacts active coating 130 as, e.g., is shown in FIG. 2B. In the same or other examples, temperature controller 150 is configured to directly control (e.g., change) the temperature of active coating 130. For example, temperature controller 150 is thermally coupled to active coating 130 as, e.g., is shown in FIG. 2C. Some examples of temperature controller 150 include, but are not limited to, heaters (e.g., resistive heaters) and air conditioners/chillers. The input to temperature controller 150 may be provided from various sensors 172, e.g., thermocouples positioned on the flow path of incoming stream 180, thermocouples directed at active coating surface 134, pollutant sensors 172, and the like. In some examples, the temperature of incoming stream 180 is controlled externally to purification system 100, e.g., in the vehicle exhaust systems, smokestacks, scrubbers, electro-precipitators and the like.

In some examples, purification system 100 comprises flow guide 160, which is yet another optional component. Flow guide 160 is configured to direct incoming stream 180 to active coating surface 134 and, in more specific examples, to control the angle at which incoming stream 180 is directed to active coating surface 134. Some examples of flow guide 160 include, but are not limited to, jets, nozzles, openings, and the like. In some examples, flow guide 160 is operable as a filter and configured to capture at least a portion of pollutants before these pollutants reach active coating surface 134. Alternatively, filter 170 is a standalone component, e.g., as shown in FIGS. 2A and 2B. For example, filter 170 may be positioned after ionizing purifier 110, on the path of outgoing stream 190, e.g., to capture remaining pollutants and/or purified materials 194.

Figure 3A:
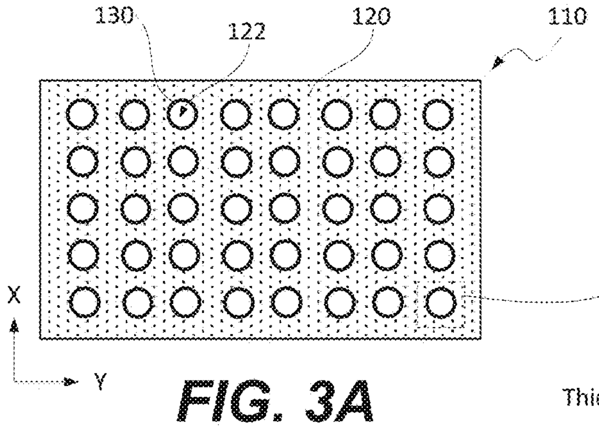
FIGS. 3A-3E are schematic cross-sectional views of different examples of substrates and active coatings disposed on these substrates.
Figure 3B:
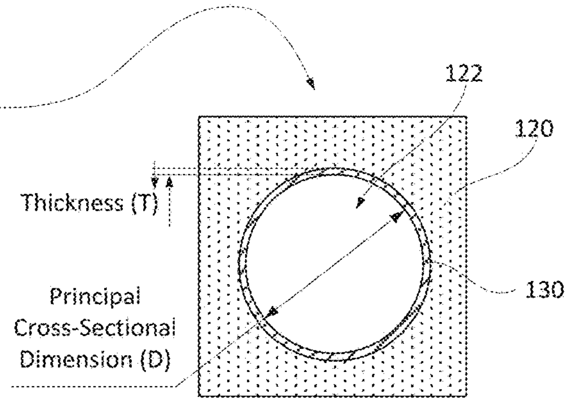

As noted above, ionizing purifier 110 comprises active coating 130, disposed on substrate 120. Substrate 120 and/or active coating 130 may be specifically configured to increase the surface area of active coating 130 while minimizing the backpressure for incoming stream 180. For example, a backpressure increase may not be desirable for various applications, such as vehicle exhaust systems. FIG. 3A illustrates substrate 120 comprising multiple pores 122 with active coating 130 disposed within pores 122 and forming the surface of these pores 122. Incoming stream 180 flows into pores 122 and contacts active coating 130, generating negative ions. These negative ions interact with pollutants in incoming stream 180. FIG. 3B is an expanded view of one pore 122. In some examples for the muffler/tailpipe, the diameter of each pore 122 is between approximately 1 millimeter and 5 millimeters. In the same or other examples, the thickness of active coating 130 is between 0.1 millimeters and 0.5 millimeters.

Figure 3C:
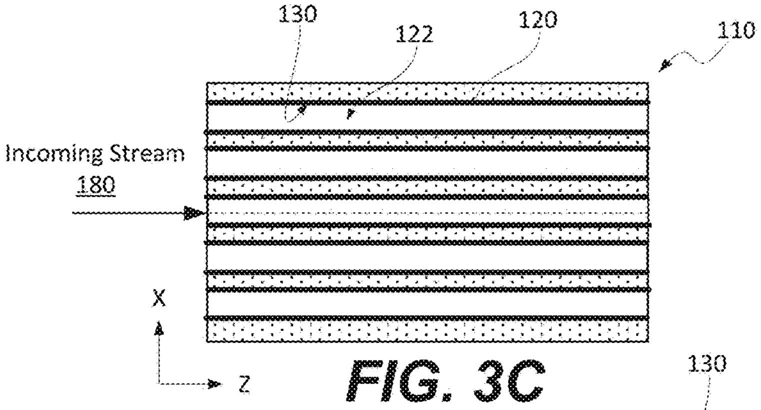
Figure 3D:
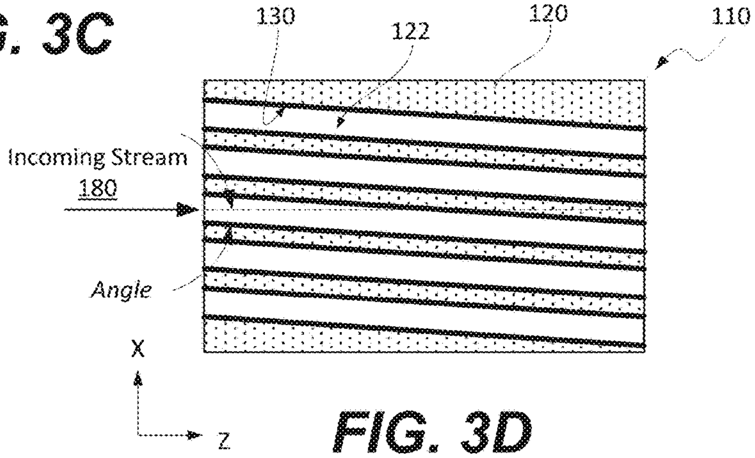
Figure 3E:
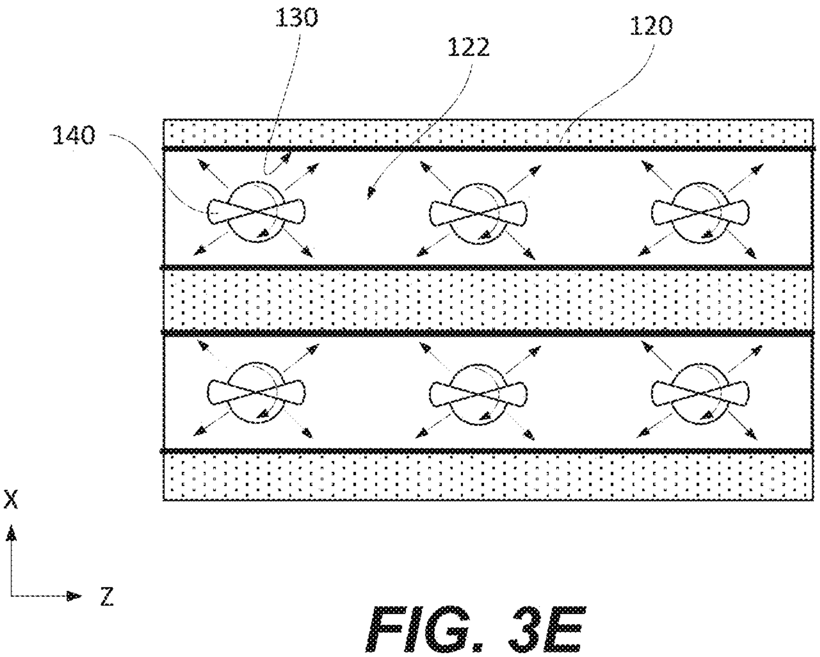

Referring to FIGS. 3C and 3D, pores 122 may have different orientations relative to the direction of incoming stream 180. Specifically, FIG. 3C illustrates an example where pores 122 are substantially parallel to the direction of incoming stream 180. This example may be used, e.g., to reduce the backpressure through ionizing purifier 110. FIG. 3D illustrates an example for the muffler/tailpipe, where pores 122 are positioned at an angle (e.g., between 1° and 15') relative to the direction of incoming stream 180. This example may be used, e.g., to increase the pressure applied by incoming stream 180 onto active coating 130 and to increase the negative ion generation rate as described above with reference to FIG. 1B. In some examples, flow speed controllers 140 is positioned within pores 122 as, e.g., is schematically shown in FIG. 3E. In these examples, flow speed controllers 140 may be also operable as flow guide 160, e.g., for even distribution of incoming stream 180 within pores 122.

Furthermore, as noted above, active coating 130 comprises material 131, which is pyroelectric and/or piezoelectric. For purposes of this disclosure, pyroelectric materials are defined as materials that can generate an electric potential when heated or cooled. Piezoelectric materials are defined as materials that can generate an electric charge in response to mechanical stress (e.g., compression). It should be noted that all known pyroelectric materials are also piezoelectric. Some examples of material 131 include, but are not limited to aluminum nitride (AlN), aluminum phosphate ($AlPO_4$), barium titanate ($BaTiO_3$), Bismuth Titanate ($Bi_{12}TiO_{20}$, $Bi_4Ti_3O_{12}$ and/or $Bi_2Ti_2O$), gallium nitride (GaN), gallium phosphate ($GaPO_4$), lithium niobate ($LiNbO_3$), lithium tantalate ($LiTaO_3$), Lithium Tetraborate ($Li_2B_4O_7$), quartz ($SiO_2$), tourmaline (e.g., crystalline boron silicate mineral compounded with elements such as aluminum, iron, magnesium, sodium, lithium, or potassium), triglycine sulfate ($(NH_2CH_2COOH)_3.H_2SO_4$), and zinc oxide (ZnO). One or more of these materials (e.g., as specific combinations) are used for specific use cases depending on numerous factors, including, but not limited to temperature, pressure, surface area, and the like.

Figure 4A:
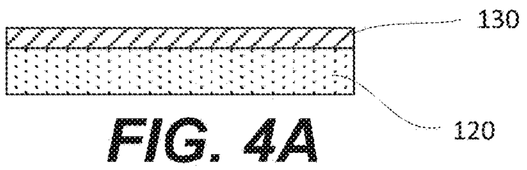
FIGS. 4A-4G are schematic cross-sectional views of different active coating examples.
Figure 4B:
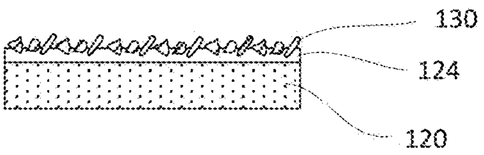
Figure 4C:
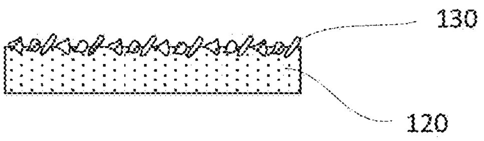
Figure 4D:
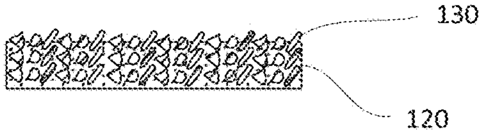

Various structural examples of active coating 130 will now be described with reference to FIGS. 4A-4G. FIG. 4A illustrates an example where active coating 130 is continuous, isolating substrate 120, disposed below active coating 130, from the environment. For example, particles of material 131 are fused together forming active coating 130. Alternatively, active coating 130 comprises a plurality of disjoined particles, positioned at least on the surface of substrate 120 as, e.g., is schematically shown in FIGS. 4B, 4C, and 4D. For example, FIG. 4B illustrates an example in which the disjoined particles (forming active coating 130) are supported on the surface of substrate 120 using adhesive 124 or any other binding material. FIG. 4C illustrates an example in which the disjoined particles (forming active coating 130) are directly integrated into substrate 120 without using any intermediate materials. FIG. 4D is yet another example in which disjoined particles (forming active coating 130) are distributed throughout the entire volume of substrate 120, not just on the surface. This example may be used, e.g., for porous substrates where incoming stream 180 can penetrate substrate 120. For example, substrate 120 may include concrete or, more specifically porous concrete with active coating 130 in the form of particles dispersed through the concrete.

Figure 4E:
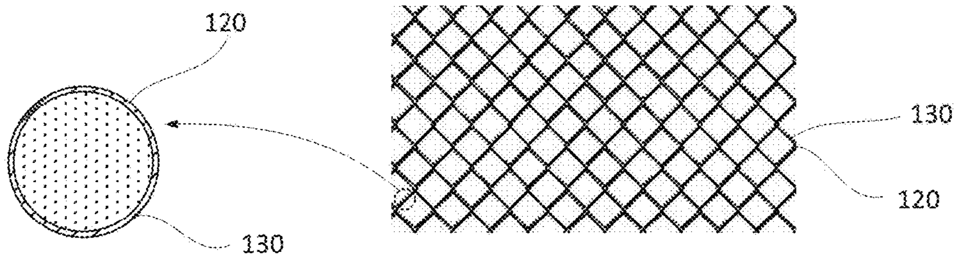

In some examples, substrate 120 is not a continuous impermeable structure. For example, substrate 120 may be in the form of a mesh (e.g., as shown in FIG. 4E), foam, or other structures, which allow for incoming stream 180 to flow through substrate while contacting active coating 130 positioned on the surface of substrate 120. This type of substrate may be used for systems with high flow rates of incoming streams and where the backpressure is especially undesirable.

Figure 4F:
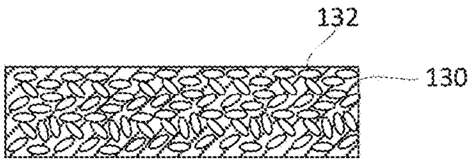
Figure 4G:
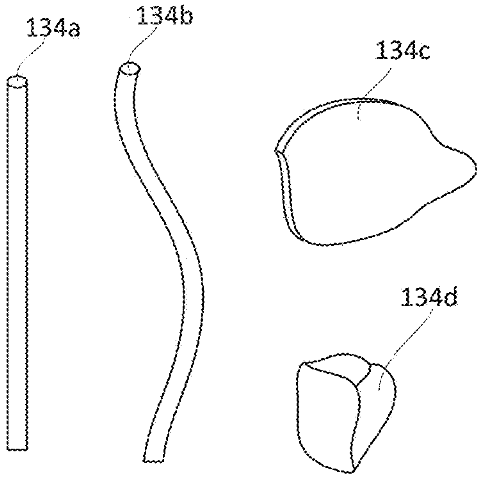

In some examples, active coating 130 comprises active coating pores 132 as, e.g., is shown in FIG. 4F. In these examples, incoming stream 180 is directed into active coating pores 132. These examples may be used without substrate 120, which is optional.

Overall, particles of active coating 130 may be in various forms, e.g., powder, stone, crushed stone, chips, pebbles, gravel, rods, and the like. The particles may be identified as 1-D structures (labeled as 134*a* and 134*b* in FIG. 4G), 2-D structures (labeled as 134*c* in FIG. 4G), and 3-D structures (labeled as 134*d* in FIG. 4G). For purposes of this disclosure, a 1-D structure has a ratio of one principal dimension to each of the remaining two dimensions greater than 10. Some examples include, but are not limited to, nanotubes, nanowires, and fibers. A 2-D structure has a ratio of each of two principal dimensions to the remaining dimension greater than 10. Some examples include, but are not limited to, flakes and sheets or, more specifically, thin conductive graphite and graphene. A ratio of any two principal dimensions in a 3-D structure is less than 10.

In some examples, active coating 130 is formed by 3D printing methods/processes, some examples of which include, but not limited to, Binder Jetting (e.g., using a liquid binding agent to bond layers of material to form a part) and Bound Powder Extrusion (e.g., an extrusion-based metal additive manufacturing process).

In some examples, substrate 120, which supports active coating 130, is selected from the group consisting of a fan blade, a filter surface, an enclosure surface, ionizer electrodes, smokestack interior walls, scrubber components, and electrostatic precipitator components. In other words, active coating 130 may be integrated into various components of the purification systems. Therefore, the function of different components may overlap.

Operating Examples

Figure 5:
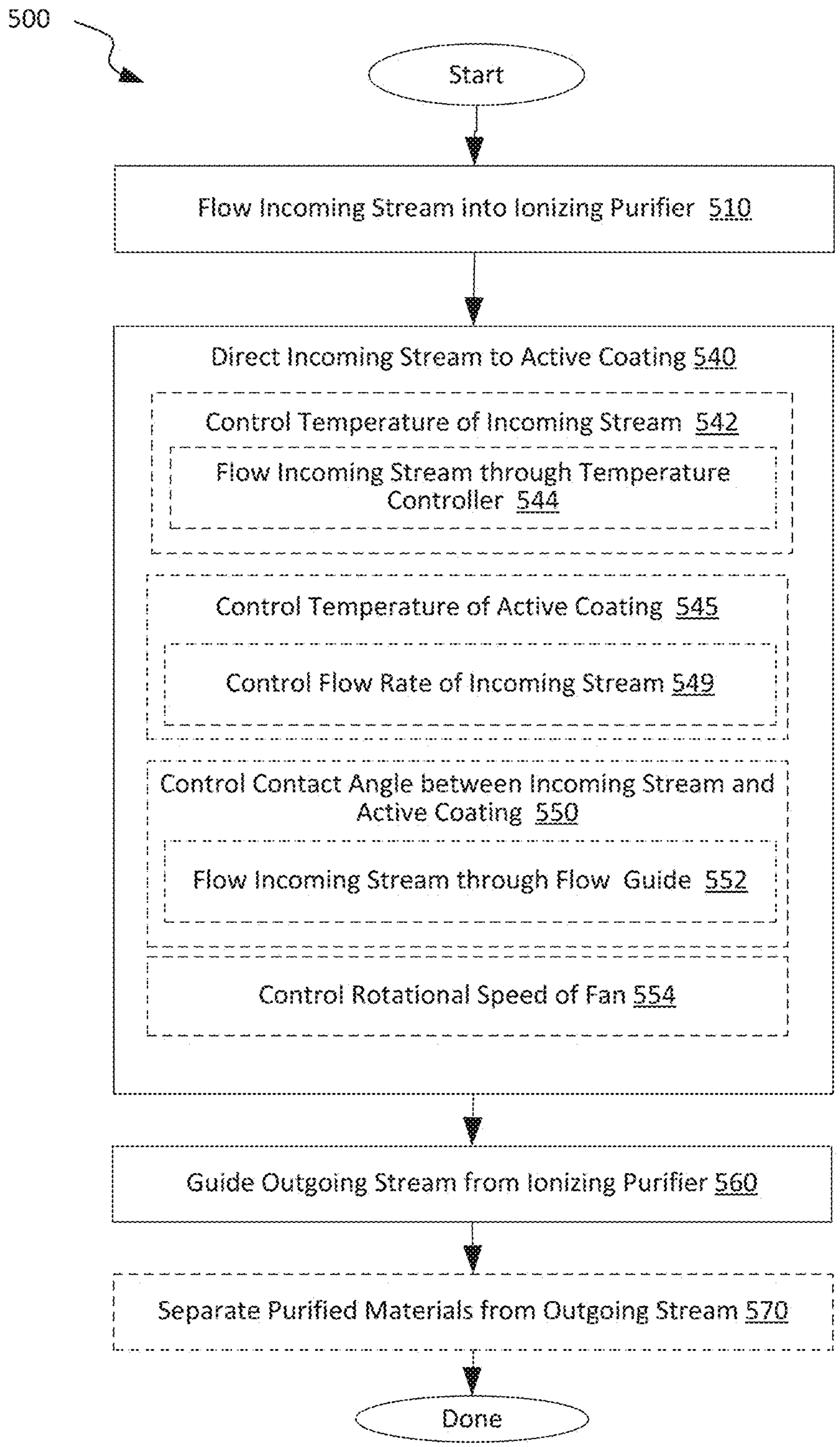
FIG. 5 is a process flowchart corresponding to a method of purifying an incoming stream using a purification system, in accordance with some examples.

FIG. 5 is a process flowchart corresponding to method 500 of purifying incoming stream 180 using purification system 100, in accordance with some examples. Various features and examples of purification system 100 are described above. For example, purification system 100 comprises ionizing purifier 110, which in turn comprises substrate 120 and active coating 130. Active coating 130 is disposed on substrate 120 and comprises material 131, which is pyroelectric and/or piezoelectric. The composition of material 131, other features of active coating 130, and processing conditions (further described below) are specifically selected to enable negative ion generations during the operation of purification system 100 or, more specifically, during the operation of ionizing purifier 110 or, even more specifically, when incoming stream 180 contacts active coating 130.

In some examples, method 500 comprises flowing incoming stream 180 into ionizing purifier 110 (block 510 in FIG. 5). Incoming stream 180 comprises one or more pollutants 186, such as carbon monoxide, carbon dioxide, nitrogen oxides, hydrocarbons, and/or particulate matter. Other components of incoming stream 180 may include but are not limited to air 182, water 184 (e.g., as water vapor), and/or other ionizing components 188.

In some examples, incoming stream 180 is flown (into ionizing purifier 110) from one or more emission sources, such as an internal combustion engine, a burner, and the like. Alternatively, incoming stream 180 may be collected from the environment (e.g., ambient air, house interior, vehicle interior).

Method 500 proceeds with directing incoming stream 180 toward active coating 130 (block 540 in FIG. 5). Specifically, incoming stream 180 is directed toward active coating 130 while controlling the average pressure that incoming stream 180 exerts on active coating 130. As noted above, this pressure is one of the driving forces or generating negative ions within ionizing purifier 110. In some examples, the average pressure in the muffler/tailpipe is between 0.25 bar and 2 bar or, more specifically, between 0.50 bar and 1.25 bar. It should be noted that in some examples, the pressure may vary across the surface of active coating 130.

Upon contacting active coating 130, incoming stream 180 generates negative ions 192 from one or more components of incoming stream 180. In some examples, the rate of generating negative ions is between 15,000 and 25,000 per cubic centimeter per second. This rate depends on various factors, such as the composition of incoming stream 180, the temperature of incoming stream 180, the temperature of active coating 130, the pressure exerted by incoming stream 180 onto active coating 130, and/or the composition of active coating 130. For example, the negative ion generation rate increases with the increase of temperature (of active coating 130 and/or incoming stream 180) and the increase of the pressure as described above with reference to FIGS. 1B and 1C. Once negative ions 192 are generated, negative ions 192 start interacting with one or more pollutants 186 forming purified materials 194 of outgoing stream 190. Various examples of these interactions are described above with reference to FIG. 1A.

In some examples, directing incoming stream 180 toward active coating 130 (block 540) is performing while controlling the temperature of incoming stream 180 (block 542) before contacting active coating 130. One example of this temperature controlling is flowing incoming stream 180 through temperature controller 150 (block 544) before contacting active coating 130. Various examples of temperature controller 150 are presented above (e.g., a heater and/or an air conditioner/chiller). In this example, temperature controller 150 changes the temperature of incoming stream 180 (e.g., cools incoming stream 180 or heats incoming stream 180) before incoming stream 180 contacts active coating 130. In some examples, directing incoming stream 180 toward active coating 130 (block 540) is performing while controlling the temperature of active coating 130 (block 545). For example, controlling the temperature of active coating 130 may be performed using temperature controller 150, thermally coupled to active coating 130 (e.g., integrated into substrate 120).

In some examples, incoming stream 180 is vehicle exhaust gas. The exhaust temperatures vary per vehicle, engine size, operating conditions, ambient conditions, and the like. For example, the temperature of active coating 130 when incoming stream 180 contacts active coating 130 in a small car may be between approximately 300-500 degrees Celsius.

In some examples, controlling the temperature of active coating 130 (block 545) comprises controlling the flow rate of incoming stream 180 (block 549) as incoming stream 180 flows into ionizing purifier 110. For example, incoming stream 180 may be a source of heat for heating active coating 130, such as an exhaust gas produced by an internal combustion engine and flown into the exhaust system. As described before, active coating 130 may be positioned in the exhaust system, supported by various internal components of the system. The flow rate of incoming stream 180, the temperature of incoming stream 180, and thermal isolation of active coating 130 determine the temperature of active coating 130.

In some examples, directing incoming stream 180 toward active coating 130 is performing while controlling the contact angle between incoming stream 180 and active coating 130 (block 550). As described above, this contact angle determines, at least in part, the average pressure that incoming stream 180 exerts on active coating 130. Other factors include the flow rate of incoming stream 180 and the concentration of various gases in incoming stream 180.

In some examples, controlling the contact angle between incoming stream 180 and active coating 130 (block 550) comprises flowing incoming stream 180 through flow guide 160 (552). Various examples of flow guide 160 (e.g., nozzle, jet) are presented above.

In some examples, directing incoming stream 180 toward active coating 130 is performed through a set of concentric structures 128 as, for example, is shown in FIGS. 6A-6D. At least one of the concentric structures 128 is operable as substrate 120 for active coating 130. Furthermore, at least another one of concentric structures 128 comprises a set of openings 127, operable as a flow guide 160, directing incoming stream 180 toward active coating 130. In some examples, at least another one of concentric structures 128 is an air filter. In the same or other examples, the set of concentric structures 128 is a part of an automotive exhaust system.

In some examples, directing incoming stream 180 to active coating 130 (block 540) is performed using a fan, operable as a flow speed controller 140. In these examples, controlling the average pressure that incoming stream 180 exerting on active coating 130 comprises controlling the rotational speed of the fan (block 554).

In some examples, active coating 130 is enclosed within ionizing purifier 110, blocking environmental light when incoming stream 180 generates negative ions 192 from one or more components of incoming stream 180. As such, negative ions 192 are generated without the light or, more specifically, the sunlight. The ionization energy is derived from the heat and/or the pressure at the interface of active coating 130 and incoming stream 180 or, more specifically, at this interface when incoming stream 180 contacts active coating 130. As such, in some examples, active coating 130 is free from sunlight exposure when generating negative ions 192.

Method 500 proceeds with flowing outgoing stream 190 from ionizing purifier 110 (block 560). At this stage, outgoing stream 190 comprises purified materials 194. In some examples, a fan is positioned to direct outgoing stream 190 from ionizing purifier 110.

In some examples, method 500 further comprises separating purified materials 194 from outgoing stream 190 (block 570). For example, outgoing stream 190 may be passed through a filter, scrubber, and the like. Various examples of separation devices are within the scope.

Application Examples

Figure 6A:
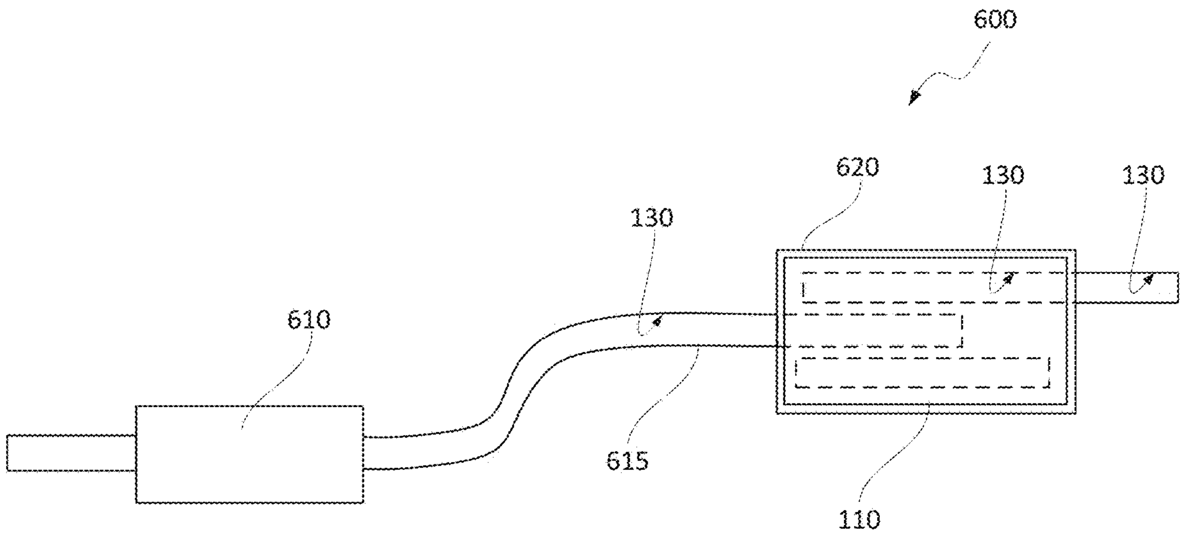
FIGS. 6A-6D are schematic cross-sectional views of different components and features in a vehicle exhaust system, operable as a purification system and comprising an ionizing purifier, in accordance with some examples.

In some examples, purification system 100 is used as a part of vehicle emission system 600 as, for example, is schematically shown in FIG. 6A. Vehicle emission system 600 may be a part of a vehicle with an internal combustion engine, such as a gasoline-power engine, a diesel-power engine, a compressed natural gas (CNG) engines, and the like. Referring to FIG. 6A, in some examples, vehicle emission system 600 comprises catalytic converter 610, connecting pipes 615, and muffler 620. Purification system 100 or, more specifically, ionizing purifier 110 may be integrated into one or more of these components. For example, active coating 130 may be positioned in connecting pipes 615 and/or muffler 620. Internal components of muffler 620 may be specifically configured to enhance the performance of ionizing purifier 110 as will now be described with reference to FIGS. 6B, 6C, and 6D.

Figure 6B:
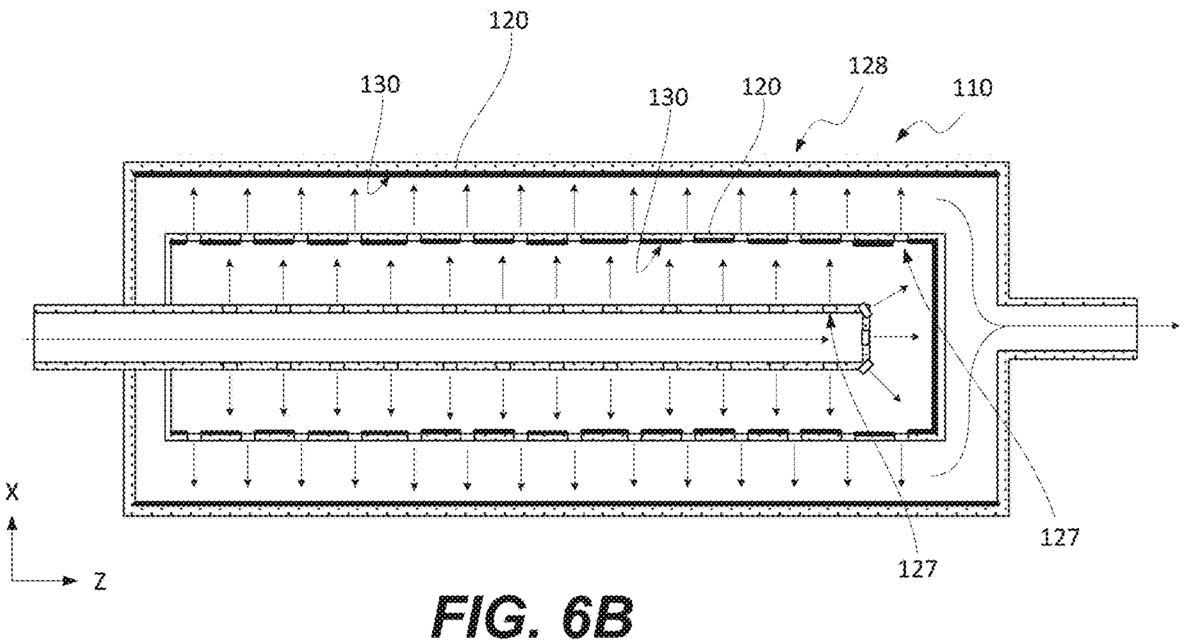
Figure 6C:
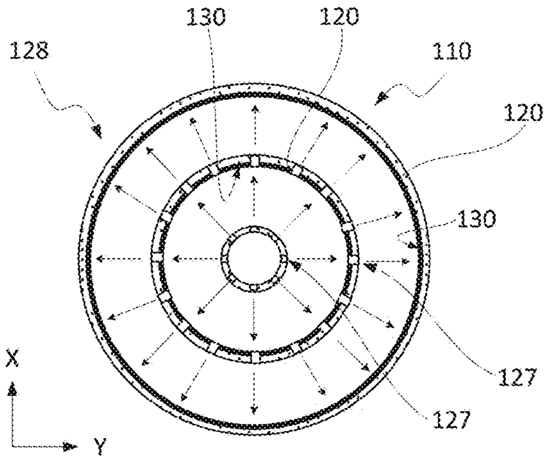
Figure 6D:
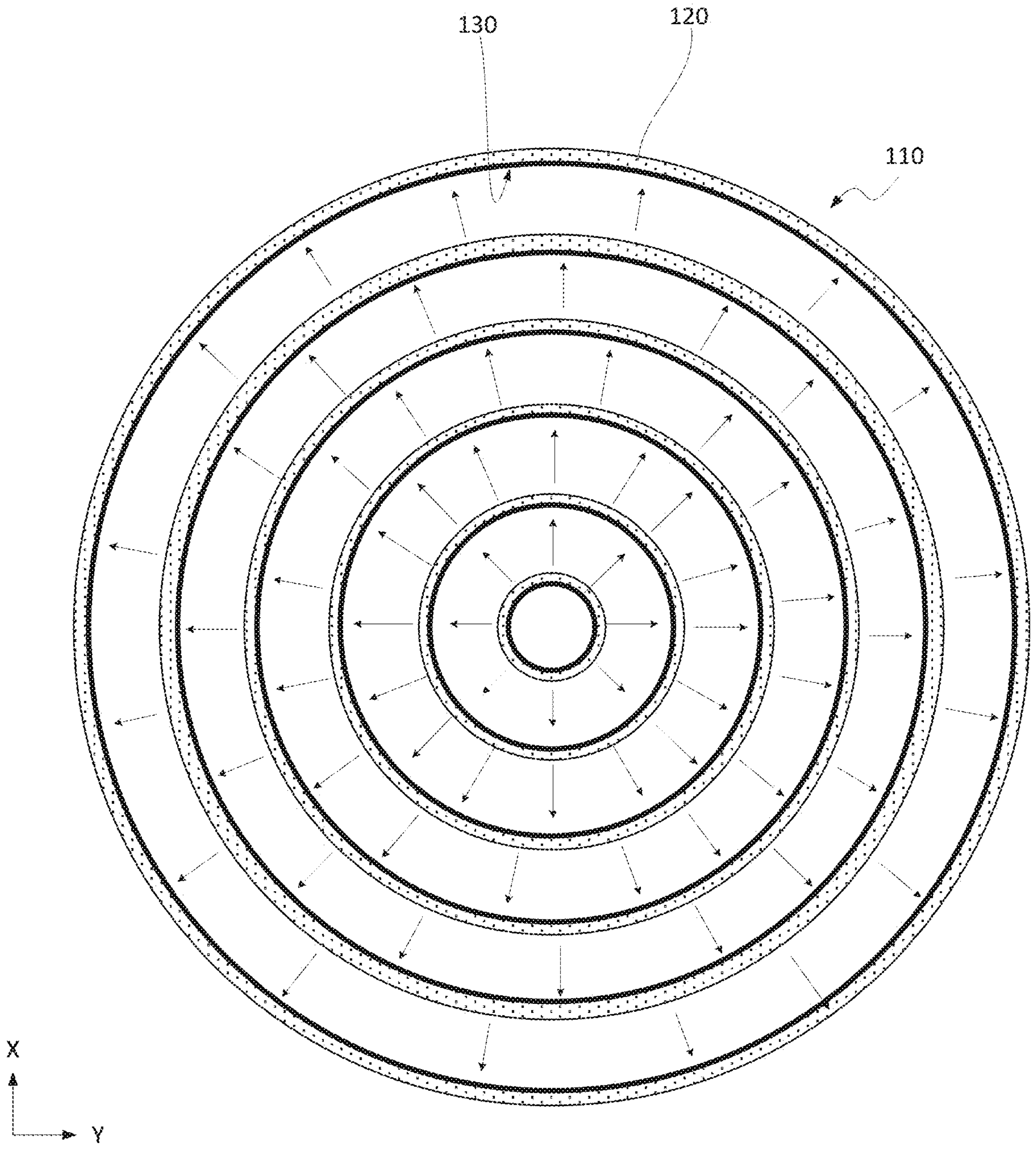

Specifically, FIGS. 6B, 6C, and 6D illustrate a set of concentric structures 128, at least one of which is operable as the substrate 120 for active coating 130. For example, this set of concentric structures 128 may be positioned in muffler 620. In the same or other examples, this set may be used as a filter. At least another one of the sets of concentric structures 128 comprises a set of openings 127, operable as flow guide 160, directing incoming stream 180 toward active coating 130. For example, the placement of the structures in FIGS. 6C and 6D are designed to interact with vehicle emission airflow that is emitted from perforated tubes in the mufflers, while not blocking the linear horizontal flow of exhaust out of the muffler towards the tailpipe.

Negative-ion based purification provides unique opportunities for cleaning vehicle emissions. Various thermal gradients in vehicle emission system 600 may be used for negative ion generations by specific positions of active coating 130 throughout vehicle emission system 600. Furthermore, water vapor, which is present in the vehicle emission and which is a part of the combustion process, helps with triggering the Lenard effect during this purification process. It should be noted that water is generally not added into incoming stream 180 before contacting active coating 130. However, some examples of incoming stream 180 (e.g., vehicle exhaust) already contain water as one component of incoming stream 180.

It should be noted that vehicle emission system 600, described above, is not limited to cars and trucks. These features are also applicable to cruise/cargo ships, passenger ferries, airplanes, industrial machines, equipment (chainsaws, lawnmowers, leaf blowers, etc.) and the like.

Figure 7A:
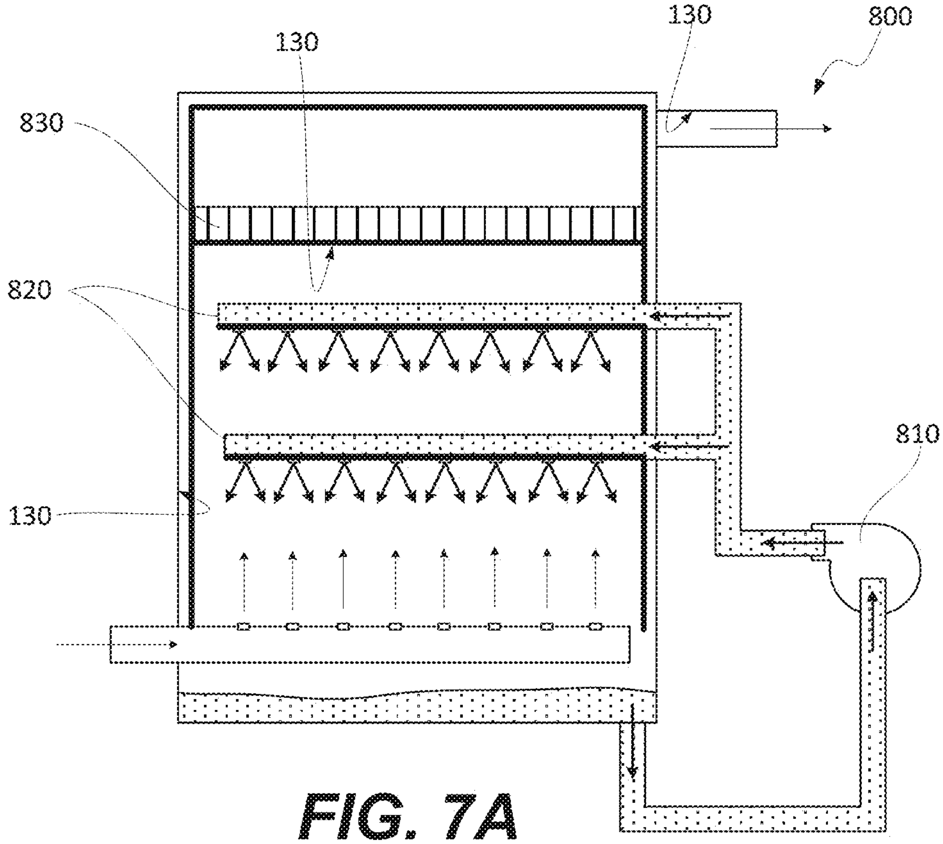
FIGS. 7A and 7B are two examples of industrial emission systems, each comprising one or more ionizing purifiers.
Figure 7B:
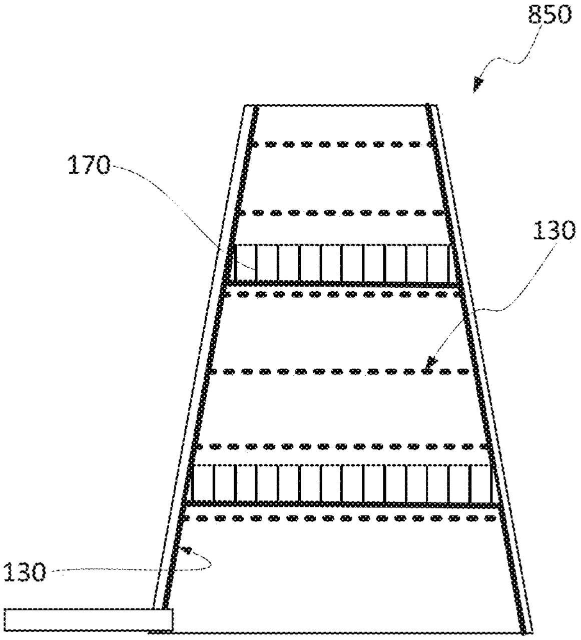

FIGS. 7A and 7B are two examples of industrial emission systems, each comprising one or more ionizing purifiers. Any smokestack can be lined/fused/infused with active coating 130 as, for example, is shown in these figures. Smokestacks and scrubbers provide larger surface areas for positioning active coating 130. Furthermore, various components enabling the operation of purification system 100, besides active coating 130, maybe already present in these industrial emission systems. For example, a scrubber, which is shown in FIG. 7A, distributes water, which can trigger the Lenard effect and assist with the negative ion generation. Furthermore, a scrubber may be equipped with various flow control devices (e.g., fans) to move the industrial emission through the scrubber. These flow control devices may be operable to control the pressure applied onto active coating 130 by incoming stream 180. Referring to FIG. 7B, a smokestack carries hot emission gases. This thermal energy can be used by active coating 130 for the negative ion generation.

Figure 8:
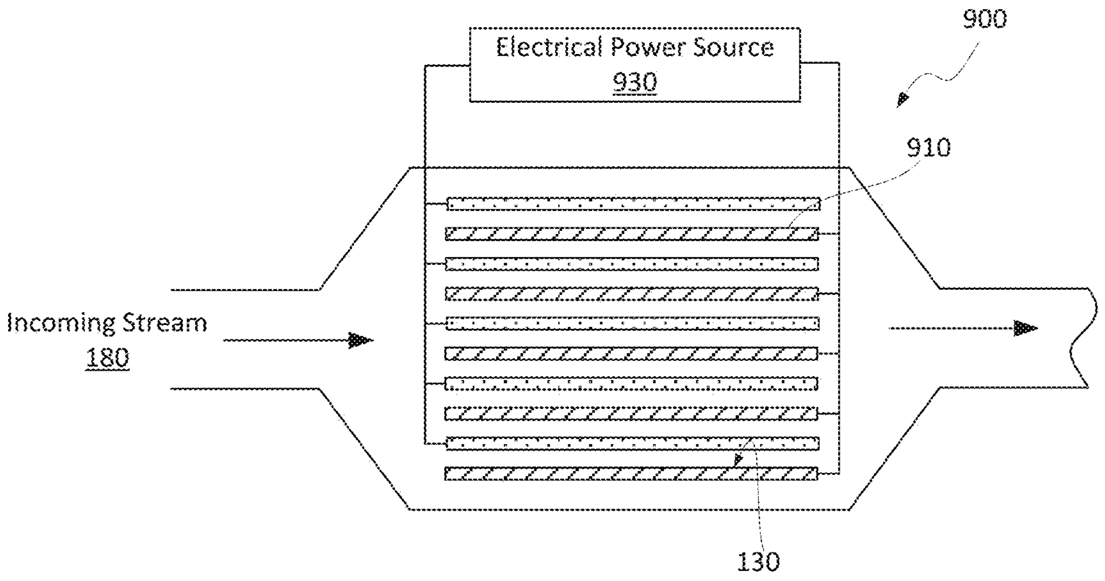
FIG. 8 is a schematic cross-sectional view of an ionizer with an integrated ionizing purifier, in accordance with some examples.

FIG. 8 is a schematic cross-sectional view of an ionizer with an integrated ionizing purifier, in accordance with some examples. One example of an ionizer is an electrostatic precipitator (ESP), which removes particles from a gas stream by using electrical energy to charge particles either positively or negatively. In some examples, active coating 130 may be incorporated onto electrodes of the ionizer. In these examples, the electrical energy is also used for the negative ion generation.

In some examples, active coating 130 may be positioned on various surfaces of heating, ventilation and air conditioning (HVAC) systems, which are used for indoor comfort and control. HVAC is an important component of residential structures (e.g., single-family homes, apartment buildings, condos) hotels, senior living facilities, office buildings, vehicles (e.g., cars, trains, airplanes, ships, and submarines), or other spaces where conditions are regulated with respect to humidity, temperature, etc. For purposes of this disclosure, HVAC refers to all types of systems (e.g., central HVAC systems, window units, stand-alone/portable heaters and air conditioners/coolers, and the like). For example, active coating 130 may be positioned in/upon air ducts, filter elements, blower blades, evaporator coil, and the like.

Conclusion

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:

1. A method of purifying an incoming stream using a purification system to form an outgoing stream, the method comprising:

flowing the incoming stream into an ionizing purifier of the purification system, wherein:

the incoming stream comprises one or more pollutants, and the ionizing purifier comprises a substrate and an active coating, disposed on the substrate and comprising a piezoelectric material selected from the group consisting of aluminum nitride, aluminum phosphate, barium titanate, bismuth titanate, gallium nitride, gallium phosphate, lithium niobate, lithium tantalate, lithium tetraborate, tourmaline, and triglycine sulfate;

directing the incoming stream toward the active coating while controlling an average pressure that the incoming stream exerts on the active coating and changing temperature of the active coating, wherein:

the incoming stream generates negative ions from one or more components of the incoming stream upon contacting the active coating caused by the average pressure exerted by the incoming stream on the active coating through a piezoelectric effect, and the negative ions interact with the one or more pollutants and transform carbon dioxide forming purified materials of the outgoing stream; and guiding the outgoing stream, comprising the purified materials, from the ionizing purifier.

2. The method of claim 1, wherein directing the incoming stream toward the active coating is performed while controlling temperature of the incoming stream before contacting the active coating.

3. The method of claim 1, wherein directing the incoming stream toward the active coating is performing while controlling temperature of the active coating.

4. The method of claim 3, wherein controlling the temperature of the active coating comprises controlling a flow rate of the incoming stream, flowing into the ionizing purifier.

5. The method of claim 1, wherein directing the incoming stream toward the active coating is performing while controlling a contact angle between the incoming stream and the active coating.

6. The method of claim 1, wherein the active coating is enclosed within the ionizing purifier, blocking environmental light when the incoming stream generates the negative ions from the one or more components of the incoming stream.

7. The method of claim 1, wherein directing the incoming stream toward the active coating is performed through a set of concentric structures, at least one of which is operable as the substrate for the active coating.

8. The method of claim 1, wherein directing the incoming stream to the active coating is performed using a fan, operable as a flow speed controller, and wherein the controlling the average pressure that the incoming stream exerting on the active coating comprises controlling a rotational speed of the fan.

9. The method of claim 1, wherein the incoming stream, flown into the ionizing purifier, comprises water.

10. The method of claim 1, further comprising separating the purified materials from the outgoing stream.

11. The method of claim 1, wherein the material of the active coating comprises two different ones of aluminum nitride, aluminum phosphate, barium titanate, bismuth titanate, gallium nitride, gallium phosphate, lithium niobate, lithium tantalate, lithium tetraborate, tourmaline, triglycine sulfate, and zinc oxide.

12. The method of claim 1, wherein the substrate, supporting the active coating, is selected from the group consisting of a fan blade, a filter surface, an enclosure surface, ionizer electrodes, smoke stack interior walls, scrubber components, and electrostatic precipitator components.

13. The method of claim 1, wherein the active coating is a continuous coating, isolating the substrate, under the active coating, from environment.

14. The method of claim 1, wherein the active coating comprises a plurality of disjoined particles, positioned on a surface of the substrate.

15. The method of claim 1, wherein the substrate is porous, and wherein the active coating comprises a plurality of disjoined particles, disposed within the substrate and away from a surface of the substrate.

16. The method of claim 1, wherein the substrate comprises pores such that the active coating forms a surface of the pores.

17. The method of claim 1, wherein the active coating comprises active coating pores such that the incoming stream is directed into the active coating pores.

18. The method of claim 7, wherein at least another one of the concentric structures comprises a set of openings, operable as a flow guide, directing the incoming stream toward the active coating.

19. The method of claim 18, wherein at least another one of the sets of concentric structures is an air filter or a part of an automotive exhaust system.

20. The method of claim 1, wherein the incoming stream is flown into the ionizing purifier from an emission source selected from the group consisting of an internal combustion engine and a burner.

21. The method of claim 20, wherein the emission source is the internal combustion engine selected from the group consisting of a gasoline-power engine, a diesel-power engine, and a compressed natural gas (CNG) engine.

22. The method of claim 20, wherein the active coating is positioned in one or more emission-system components selected from the group consisting of a connecting pipe and a muffler.

23. The method of claim 3, wherein the temperature of the active coating is between 300-500 degrees Celsius.

24. The method of claim 1, wherein the average pressure is between 0.25 bar and 2 bar.

25. The method of claim 1, wherein the negative ions are generated at a rate between 15,000 and 25,000 per cubic centimeter per second.

* * * * *